(12) United States Patent
Tung

(10) Patent No.: US 7,926,191 B2
(45) Date of Patent: Apr. 19, 2011

(54) LASER GUIDING DEVICE FOR MACHINE TOOLS

(75) Inventor: Hsin-Chih Tung, Chung-Li (TW)

(73) Assignee: LECC Technology Co., Ltd., Tao Yuan Hsien (TW)

( * ) Notice: Subject to any disclaimer, the term of this patent is extended or adjusted under 35 U.S.C. 154(b) by 312 days.

(21) Appl. No.: 12/219,720

(22) Filed: Jul. 28, 2008

(65) Prior Publication Data
US 2010/0018067 A1 Jan. 28, 2010

(51) Int. Cl.
*G01C 15/00* (2006.01)
(52) U.S. Cl. ...................................... 33/286; 33/DIG. 21
(58) Field of Classification Search .................... 33/286, 33/278–285, 227, DIG. 21
See application file for complete search history.

(56) References Cited

U.S. PATENT DOCUMENTS

| | | | |
|---|---|---|---|
| 7,069,661 B2 * | 7/2006 | Liao | 33/286 |
| 7,121,010 B2 * | 10/2006 | Marshall et al. | 33/286 |
| 7,269,907 B2 * | 9/2007 | Levine et al. | 33/286 |
| 7,278,218 B2 * | 10/2007 | Levine | 33/286 |
| 7,497,018 B2 * | 3/2009 | Hersey et al. | 33/286 |
| 7,690,124 B1 * | 4/2010 | Henry | 33/286 |
| 7,748,126 B2 * | 7/2010 | Lu | 33/286 |
| 2004/0187327 A1 * | 9/2004 | Levine | 33/286 |
| 2005/0044735 A1 * | 3/2005 | Liao | 33/286 |
| 2005/0044736 A1 * | 3/2005 | Liao | 33/286 |
| 2005/0155238 A1 * | 7/2005 | Levine et al. | 33/286 |
| 2005/0246912 A1 * | 11/2005 | Marshall et al. | 33/286 |
| 2006/0112576 A1 * | 6/2006 | Lu | 33/286 |
| 2007/0074411 A1 * | 4/2007 | Mo | 33/286 |
| 2007/0144019 A1 * | 6/2007 | Delfini et al. | 33/286 |
| 2007/0169359 A1 * | 7/2007 | Lin | 33/286 |
| 2007/0271800 A1 * | 11/2007 | Hersey et al. | 33/286 |
| 2009/0000135 A1 * | 1/2009 | Flowers, Jr. | 33/286 |

* cited by examiner

*Primary Examiner* — Yaritza Guadalupe-McCall
(74) *Attorney, Agent, or Firm* — Rosenberg, Klein & Lee

(57) ABSTRACT

A laser guiding device for machine tools includes a casing, a circuit board and a laser module. The casing includes a base with a through-hole and a top cap covering the base. The circuit board is disposed on the base. The laser module is disposed on the base and electrically connected with the circuit board. The laser module is disposed corresponding to the through-hole of the base. An elastic body and a thread adjustment element are respectively disposed beneath and on the laser module and respectively abut against a bottom and a top of the laser module. Accordingly, the present invention can adjust the angle of the laser module via locking or releasing the thread adjustment element so that laser light is emitted along the correct direction.

13 Claims, 4 Drawing Sheets

LASER GUIDING DEVICE FOR MACHINE TOOLS

BACKGROUND OF THE INVENTION

1. Field of the Invention

The present invention relates to a laser guiding device for machine tools, especially to a laser guiding device for guiding cutting operations via laser light.

2. Description of Related Art

Machine tools are one of the main pushing hands which promote modern precision industry. Machine tools promote all kinds of high precision industry. Most of machine tools have cutting devices for cutting shapes out of raw materials.

For example, circular saw machines are one of the most widely used cutting machines. During cutting operations, cutting precision is the most important. General manual circular saw machines use saw blades to align with blank materials to achieve the cutting in a visual way depending on users' experience and hand feeling. However, the visual way of guiding is very unreliable, which usually makes the saw blades and desired saw lines offset thereby the cutting quality is quite different.

Accordingly, for overcoming the above shortcomings and improving the cutting quality, a kind of laser guiding device has developed to help users to guide the machines. The laser guiding device is disposed on the machine tools and emits laser light to help users to guide the machines. The laser guiding device includes a hollow casing, a prism and a laser module. The casing has an opening. The prism and the laser module are disposed in the casing, corresponding to the opening. Further, the prism is disposed on an outlet through which laser light from the laser module is emitted. When the laser module emits the laser light, the laser light is projected onto the prism and refracted by the prism, thereby exactly passing through the opening of the casing.

However, the laser module of the conventional laser guiding device is always positioned in the casing inexactly so that the laser light cannot be emitted along the correct direction.

Hence, the inventors of the present invention believe that the shortcomings described above are able to be improved and finally suggest the present invention which is of a reasonable design and is an effective improvement.

SUMMARY OF THE INVENTION

A main object of the present invention is to provide a laser guiding device for machine tools which can adjust angle of a laser module so that laser light is emitted along a correct direction, and improve the accuracy of emitting the laser light greatly.

To achieving the above-mentioned object, a laser guiding device for machine tools in accordance with the present invention is provided. The laser guiding device for machine tools includes a casing which includes a base with a through-hole and a top cap covering the base; a circuit board disposed on the base; and a laser module which is disposed on the base and electrically connected with the circuit board, the laser module disposed corresponding to the through-hole of the base, and an elastic body disposed beneath the laser module and a thread adjustment element disposed on the laser module, wherein the elastic body and the thread adjustment element respectively abut against a bottom and a top of the laser module.

The present invention can adjust the angle of the laser module via locking or releasing the thread guiding element so that the laser light can be emitted along the correct direction.

To further understand features and technical contents of the present invention, please refer to the following detailed description and drawings related the present invention. However, the drawings are only to be used as references and explanations, not to limit the present invention.

DETAILED DESCRIPTION OF THE PREFERRED EMBODIMENTS

Please refer to FIGS. 1-5 illustrating a laser guiding device for machine tools according to the present invention. The laser guiding device for machine tools includes a casing 1, a circuit board 2 and a laser module 3.

Figure 1:
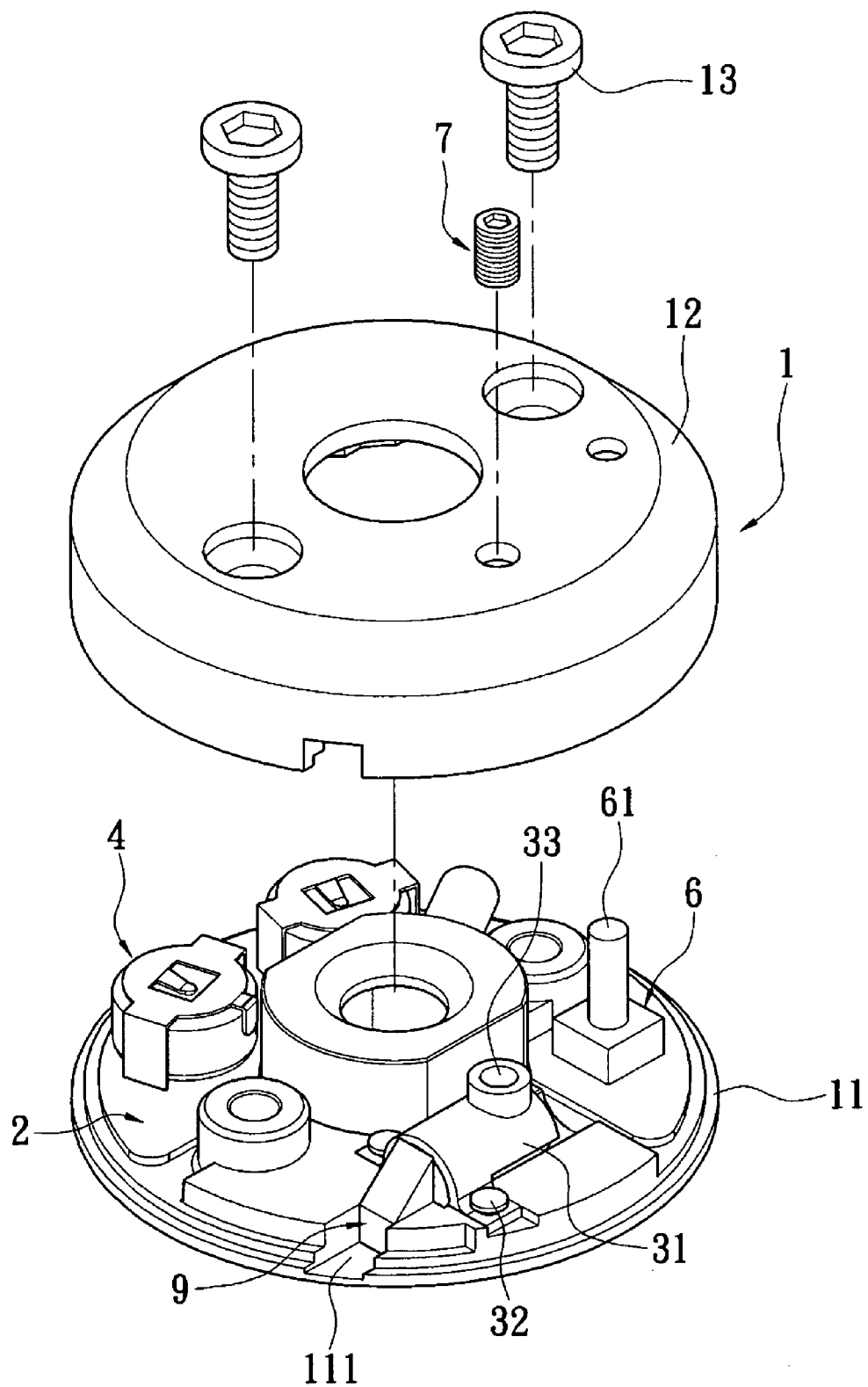
FIG. 1 is an exploded perspective view of a first embodiment of the present invention.
Figure 2:
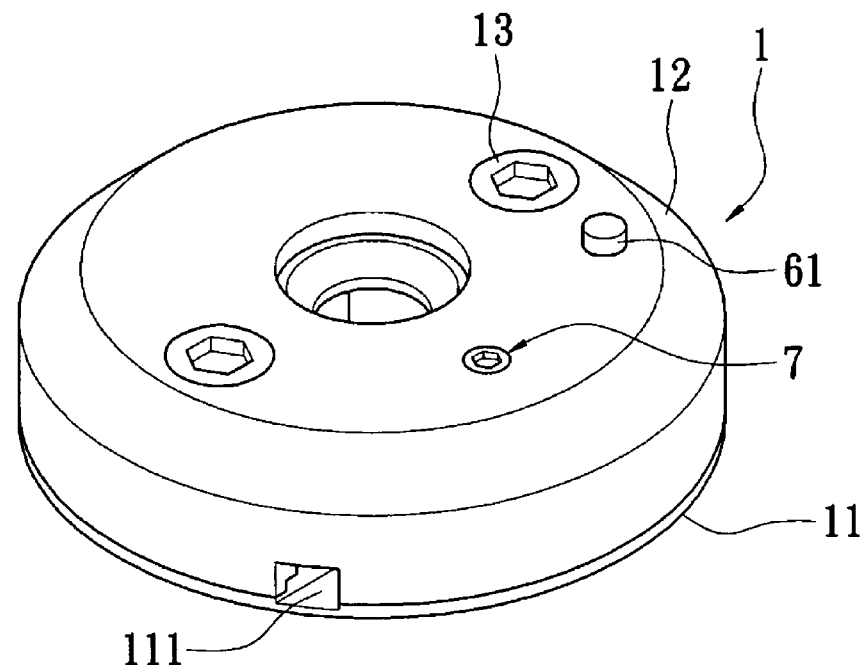
FIG. 2 is an assembled perspective view of the first embodiment of the present invention.
Figure 3:
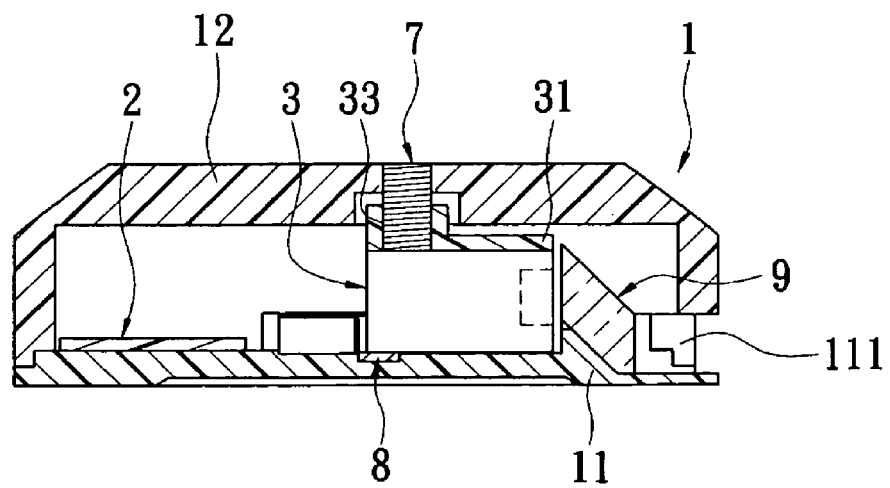
FIG. 3 is a cross-sectional view of the first embodiment of the present invention.

Please refer to FIGS. 1-3 illustrating a first embodiment of the present invention. The casing 1 includes a base 11 and a top cap 12 formed corresponding to the base 11. The base 11 is shaped like a circular plate and has a through-hole 111 extending through walls on the periphery thereof. The top cap 12 may cover the base 11 and be locked on the base 11 via two bolts 13 to form a receiving space in the casing 1, in which the circuit board 2 and the laser module 3 are received.

The circuit board 2 is formed by cutting, corresponding to the base 11, and fixed on the base 11.

The laser module 3 includes laser diodes, optical lenses and so on which are disposed in a tube together. The laser module 3 is disposed on the base 11 and electrically connected with the circuit board 2. The laser module 3 is disposed corresponding to the through-hole 111 of the base 11. A prism 9 is disposed in front of the laser module 3 in the casing 1, corresponding to the through-hole 111.

A power supply module 4 is disposed on and electrically connected with the circuit board 2 and includes a plurality of batteries for supplying power for the laser module 3 to emit laser light. A manual switch 6 is disposed on the circuit board 2. The manual switch 6 has a press button 61 extending out of the top cap 12. When a machine tool is in a resting state, users can press the press button 61 to turn on the manual switch 6 so that the laser module 3 directly emits the laser light, thereby performing the correction during the resting state.

According, when the laser module 3 emits the laser light, the laser light is directly projected onto the prism and refracted by the prism, thereby exactly passing through the through-hole 111 of the casing 1.

A cap body 31 is disposed on the laser module 3. The cap body 31 is an arc-shaped plate which is locked on the base 11 via two bolts 32 so that the laser module 3 is pressed on the base 11 via the cap body 31. The cap body 31 has a threaded hole 33 in a top thereof, which engages with a thread adjustment element 7. The thread adjustment element 7 is a bolt extending through the cap body 31 and abuts against a top of the laser module 3. An elastic body 8 is disposed beneath the laser module 3 and made of an elastic metal or an elastic plastic material. The elastic body 8 is located between the base 11 and the laser module 3 and abuts against a bottom of the laser module 3 to exert an upward thrust on the laser module 3.

If the laser light from the laser module 3 produces offset, users can press the press button 61 of the manual switch 6 when the machine tool isn't started, so that the laser module 3 continuously emits the laser light. Then users can lock or release the thread adjustment element 7 to adjust the angle of the laser module 3 and simultaneously observe whether the landing point of the laser light is correct, thereby to rectify the laser light.

Figure 4:
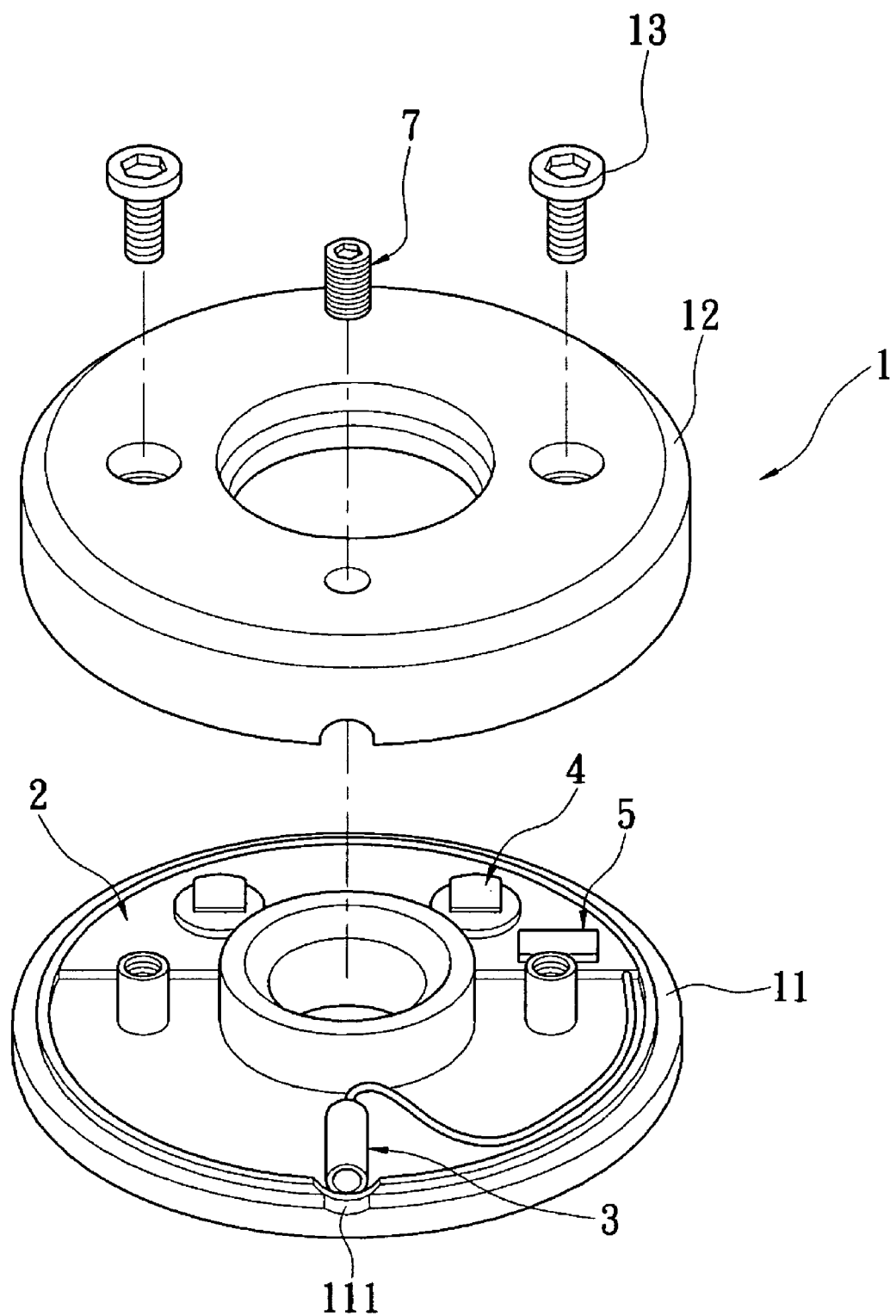
FIG. 4 is an exploded perspective view of a second embodiment of the present invention.
Figure 5:
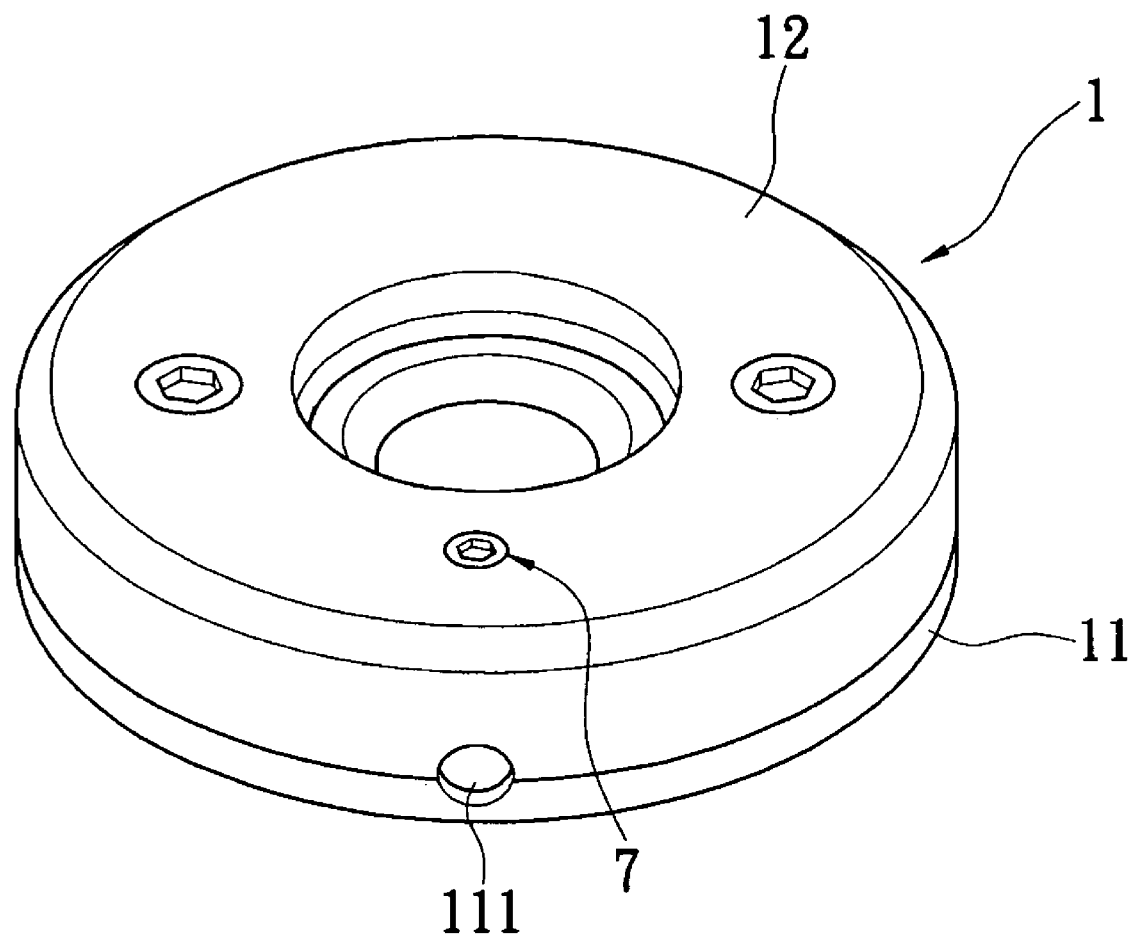
FIG. 5 is an assembled perspective view of the second embodiment of the present invention.

Please refer to FIG. 4 and FIG. 5 illustrating a second embodiment of the present invention. In the second embodiment, a vibration switch 5 is disposed on the circuit board 2. The vibration switch 5 is turned on basing on the vibration produced during the operation of the machine tool to make the power supply module 4 provide power for the laser module 3, so that the laser module 3 emits the laser light. Also, the prism 9 described above is omitted and the laser module 3 just aligns with the through-hole 111 directly, so the laser light is directly emitted through the through-hole 111. Further, the thread adjustment element 7 directly engages with the top cap 12 and abuts against the top of the laser module 3, so the angle adjustment of the laser module 3 can be achieved via locking or releasing the thread adjustment element 7.

What are disclosed above are only the specification and the drawings of the preferred embodiments of the present invention and it is therefore not intended that the present invention be limited to the particular embodiments disclosed. It will be understood by those skilled in the art that various equivalent changes may be made depending on the specification and the drawings of the present invention without departing from the scope of the present invention.

What is claimed is:

1. A laser guiding device for machine tools, comprising:
   a casing including a base having a through-slot and a top cap covering the base;
   a circuit board disposed on the base, having a vibration switch disposed thereon;
   a laser module disposed on the base electrically connected to the circuit board, the laser module disposed correspondingly to the through-slot of the base, an elastic body disposed beneath the laser module; and
   a thread adjustment element disposed on the laser module, wherein the elastic body abuts against a bottom of the laser module and the thread adjustment element abuts against the top of the laser module.

2. The laser guiding device for machine tools as claimed in claim 1, wherein a power supply module is disposed on and electrically connected with the circuit board.

3. The laser guiding device for machine tools as claimed in claim 1, wherein a manual switch is disposed on the circuit board and has a press button extending through the top cap.

4. The laser guiding device for machine tools as claimed in claim 1, wherein a prism is disposed in front of the laser module, corresponding to the through-hole.

5. The laser guiding device for machine tools as claimed in claim 1, wherein a cap body is disposed on the laser module and locked on the base, the cap body presses the laser module on the base, and the cap body has a threaded hole formed in a top thereof, with which the thread adjustment element engages.

6. The laser guiding device for machine tools as claimed in claim 1, wherein the elastic body is located between the base and the laser module.

7. The laser guiding device for machine tools as claimed in claim 1, wherein the thread adjustment element engages with the top cap.

8. A laser guiding device for machine tools, comprising:
   a casing including a base having a through-slot and a top cap covering the base;
   a circuit board disposed on the base having a vibration switch disposed thereon;
   a laser module disposed on the base electrically connected to the circuit board, the laser module disposed correspondingly to the through-slot of the base, and
   a thread adjustment element disposed on the laser module and abutting against the top of the laser module.

9. The laser guiding device for machine tools as claimed in claim 8, wherein a power supply module is disposed on and electrically connected with the circuit board.

10. The laser guiding device for machine tools as claimed in claim 8, wherein a manual switch is disposed on the circuit board and has a press button extending through the top cap.

11. The laser guiding device for machine tools as claimed in claim 8, wherein a prism is disposed in front of the laser module, corresponding to the through-hole.

12. The laser guiding device for machine tools as claimed in claim 8, wherein a cap body is disposed on the laser module and locked on the base, the cap body presses the laser module on the base, and the cap body has a threaded hole formed in a top thereof, with which the thread adjustment element engages.

13. The laser guiding device for machine tools as claimed in claim 8, wherein the thread adjustment element engages with the top cap.

* * * * *